(12) United States Patent
Kim et al.

(10) Patent No.: US 7,900,759 B2
(45) Date of Patent: Mar. 8, 2011

(54) CORD RETRACTION MECHANISM

(75) Inventors: Sung H Kim, Palo Alto, CA (US);
Russell C Mead, Jr., Chapel Hill, NC (US); Lawrence E Davis, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 1225 days.

(21) Appl. No.: 11/512,818

(22) Filed: Aug. 30, 2006

(65) Prior Publication Data

US 2008/0055237 A1    Mar. 6, 2008

(51) Int. Cl.
*B65H 75/44* (2006.01)
*H02G 11/02* (2006.01)
(52) U.S. Cl. .................................... 191/12.2 R; 191/12.4
(58) Field of Classification Search ................ 191/12 R, 191/12.2 R, 12.4; 174/69
See application file for complete search history.

(56) References Cited

U.S. PATENT DOCUMENTS 6,143,985 A * 11/2000 Knapp et al. ................. 174/69
6,926,130 B2 * 8/2005 Skowronski ............. 191/12.2 R

* cited by examiner

*Primary Examiner* — S. Joseph Morano
*Assistant Examiner* — Robert J McCarry, Jr.

(57) ABSTRACT

Various technologies and techniques are disclosed for providing a cord retraction mechanism for an input device. A subassembly having an input device, a cable, and a retraction mechanism is provided. The cable has first and second opposing ends, with the first end being operable to be coupled to a computing device, and the second end being operable to be coupled to the input device. The cable provides an electrical communication between the computing device and the input device. The cable has an extended configuration and a storage configuration. In the extended configuration, the cable extends outwardly from the computing device. In the storage configuration, the majority of the cable is in a substantially linear orientation. The retraction mechanism has at least one pulley member for displacing the pulley member between first and second positions to allow the cable to move from the storage configuration to the extended configuration.

19 Claims, 11 Drawing Sheets

CORD RETRACTION MECHANISM

BACKGROUND

Computing devices such as Tablet PCs may need to use a tethered input device, such as a stylus. Such tethered input devices are typically cheaper to produce than wireless input devices. One challenge with spooling a tethered input device is to determine how to design the device without requiring use of a slip ring (e.g. a rotating electrical connection), since slip ring designs can be quite expensive. Another challenge is to determine how to produce the cord retraction mechanism as part of the computing device in a manner that allows for separate manufacture as a subassembly.

SUMMARY

Various technologies and techniques are disclosed for providing a cord retraction mechanism for an input device. In one implementation, a subassembly having an input device, a cable, and a retraction mechanism is provided. The cable has first and second opposing ends, with the first end being operable to be coupled to a computing device, and the second end being operable to be coupled to the input device. The cable provides an electrical communication between the computing device and the input device. The cable has an extended configuration and a storage configuration. In the extended configuration, the cable extends outwardly from the computing device. In the storage configuration, the majority of the cable is in a substantially linear orientation. The retraction mechanism has at least one pulley member that is displaceable between first and second positions to allow the cable to move from the storage configuration to the extended configuration.

In another implementation, a computing device is provided that has a display screen, a processor, an input device, and the subassembly for the cord retraction mechanism of the input device. In yet another implementation, a method is provided for allowing an input device of a computing device to be moved from a storage configuration to an extended configuration.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

In one implementation, one or more of the techniques described herein can be implemented as features contained within and/or created for use with a computing device such as a Tablet PC, or from any other type of device that uses a tethered input device or tethered stylus. FIGS. 1-8 illustrate one implementation for a cord retraction mechanism. For the sake of clarity, the same reference numerals will be used to refer to the same elements throughout the various figures, although a reference number present on a particular figure may be described in the discussion for another figure.

Figure 1:
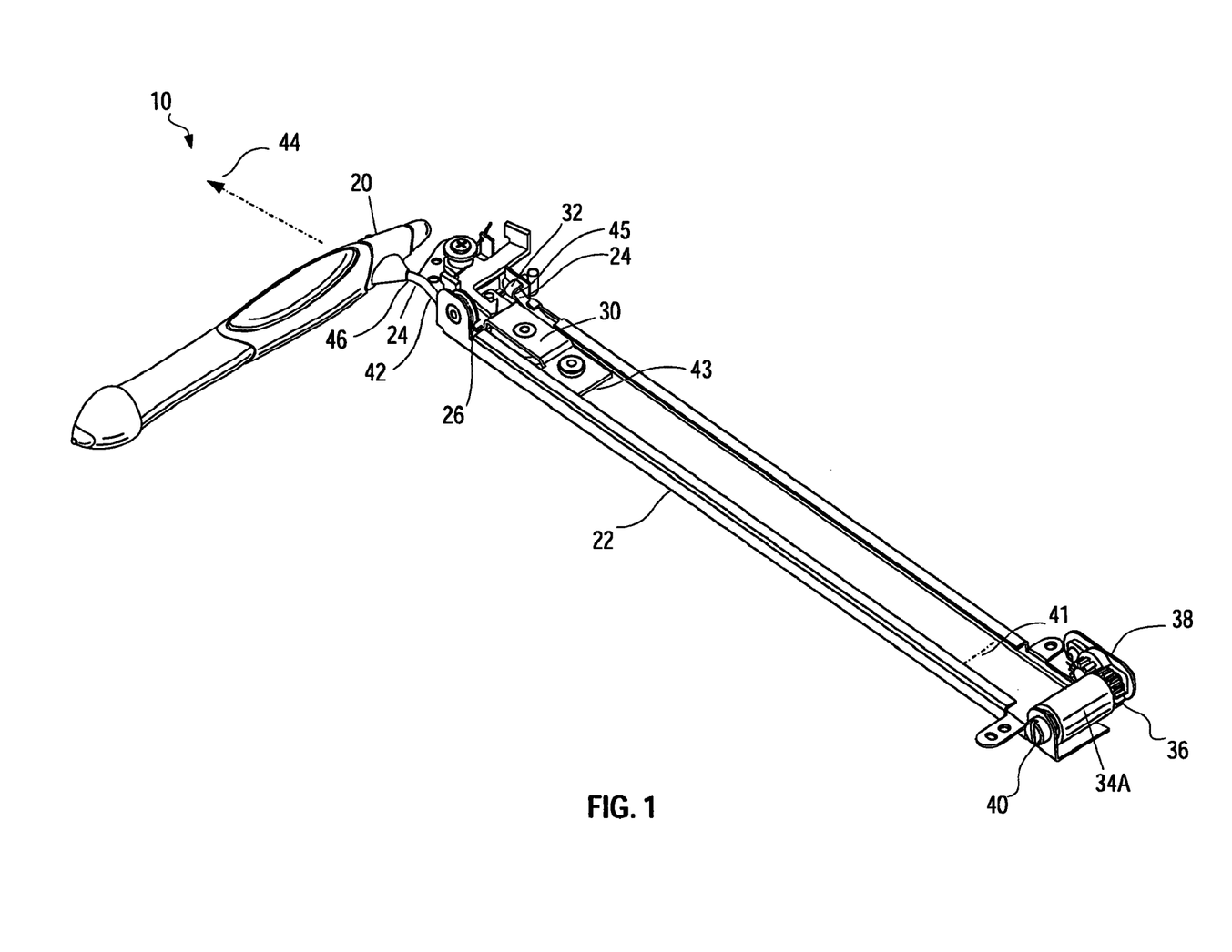
FIG. 1 is a top view of a cord retraction subassembly of one implementation.

FIG. 1 is a top view of a cord retraction subassembly 10 of one implementation. The cord retraction subassembly 10 as shown in the implementation of FIG. 1 contains various parts, such as an input device 20, a housing 22, a cable 24, a pulley member 30, and/or a first end of a biasing member 34A. Input device can be a stylus, keyboard, mouse, and/or any other type of tethered input device. Cable 24 can be one of various types of cables, such as a cheap cable, an expensive cable (e.g. flex or other cable), etc. In one implementation, housing 22 is a track made of metal, plastic, or other such materials. Housing 22 defines a cable storage volume for cable 24. In one implementation, cord retraction subassembly 10 is operable to allow input device 20 to be extended from a storage configuration 42 to an extended configuration 44 upon movement of pulley member 30 from a first position (shown with a dashed line) 41 to a second position 43. Pulley member 30 is displaceable within the cable storage volume between first position 41 and second position 43. Movement of the cable 24 from the storage configuration 42 to the extended configuration 44 displaces the pulley from the first position 41 to the second position 43. While not shown to preserve clarity, when the location of pulley member 30 is in the second position 43 as shown on FIG. 1, input device 20 would be in the extended configuration 44 at a position that may appear off of the page of the figure.

Cable 24 has a first end 45 and a second-end 46 that oppose each other in one implementation. The first end 45 is operable to be coupled to a computing device (e.g. in a non-movable fashion), and the second end 46 is operable to be coupled to the input device 20 (e.g. in a non-detachable fashion so the input device 20 is not lost, or in a detachable fashion). In one implementation, cable 24, input device 20, and end terminations for first end 45 and second end 46 of cable 24 can be pre-assembled, installed and serviced onto the subassembly 10. The extendable length of cable 24 terminating at the second end 46 extends outwardly from the computing device when the cable 24 is in the extended configuration 44. In one implementation, the length of cable 24 determines the location of extended configuration 44 and second position 43. A majority of the extendable length of cable 24 is disposed in a substantially linear orientation when the cable is in the storage configuration. In one implementation, by spooling the cable 24 inside housing 22, the cable 24 is stored in a volume efficient way, as opposed to allowing the excess cable to be managed outside of the device.

Figure 2:
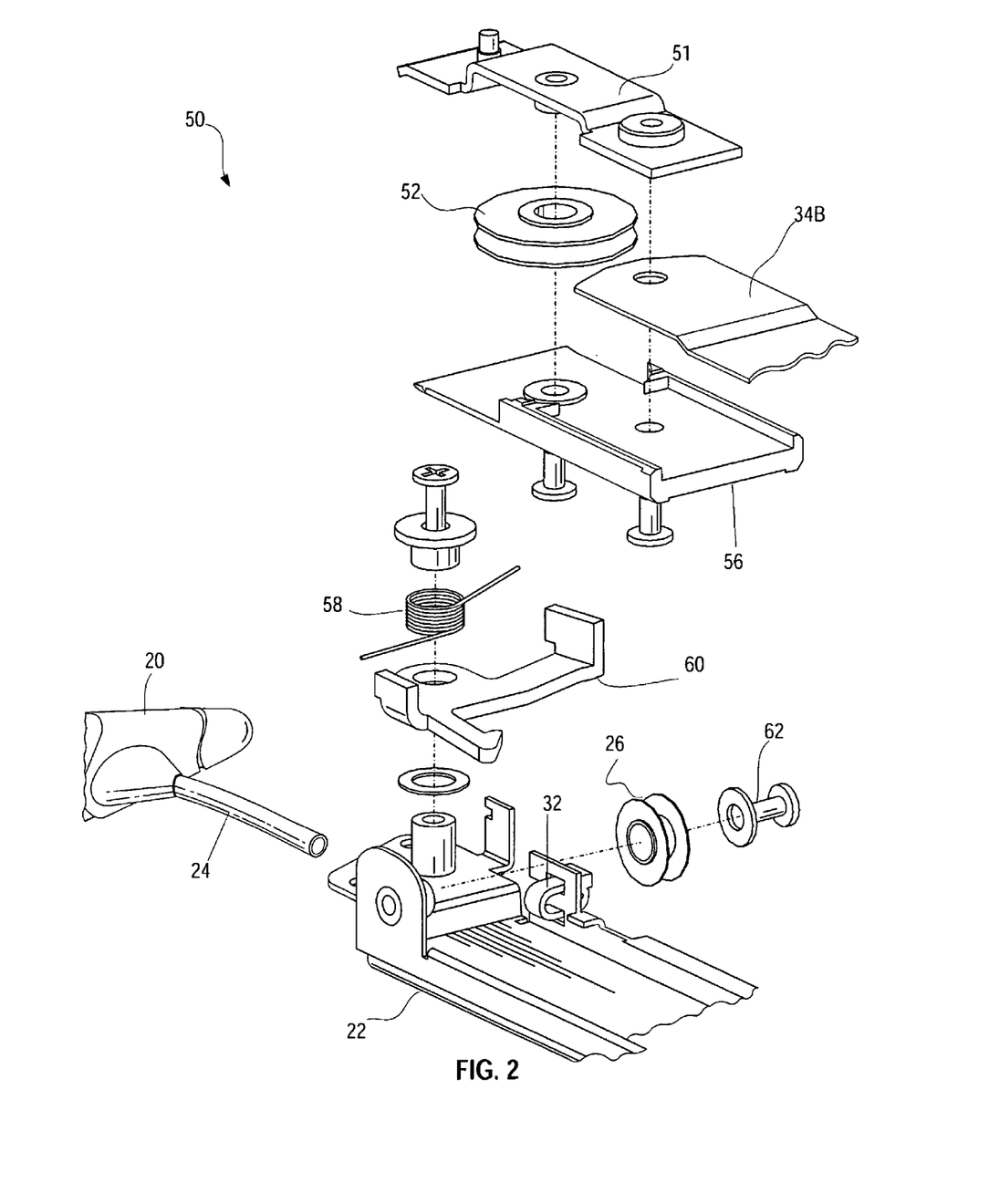
FIG. 2 is an exploded side view of some component parts that when put together form a first end of a retraction mechanism of the subassembly of FIG. 1.

Turning now to FIG. 2, with continued reference to FIG. 1, an exploded side view of some component parts that when put together form a first end of a retraction mechanism 50 of the subassembly 10 of FIG. 1 is shown. Sled plate 51 fits over pulley 52, which fits over second end of biasing member 34B. In one implementation, biasing member (collectively 34) is a constant force spring. In other implementations, other types of springs can be used. In another implementation, biasing member can be a motor. Second end of biasing member 34B fits over sled 56, which fits over spring 58. Spring 58 can be a torsion spring or any other type of spring as would occur to one of ordinary skill in the art. Latch member 60 is seated underneath spring 58, and is used in one implementation to engage the pulley member 30 in an extended configuration in a fashion that does not allow cable 24 to retract input device 20 until a button or other release is engaged to release latch 60. Latch member is described in further detail in FIG. 4. In one implementation, pulley member 30 comprises sled plate 51, pulley 52, second end of biasing member 34B, sled 56, spring 58, and latch 60 as shown in FIG. 2. In other implementations, pulley member 30 comprises any type of mechanism for guiding a cable along a particular path, which may include some, all, fewer, and/or additional components than shown in FIG. 2.

The first end of the retraction mechanism 50 of one implementation also includes an exit roller 26 which is coupled to housing 22 using a screw 62 or other fastening means. Cable anchor 32 is operable to anchor cable 24 so that it does not move, and to provide strain relief. The remainder of cable 24 which extends beyond the anchor 32 to form the electrical connection is not shown to preserve clarity.

Figure 3:
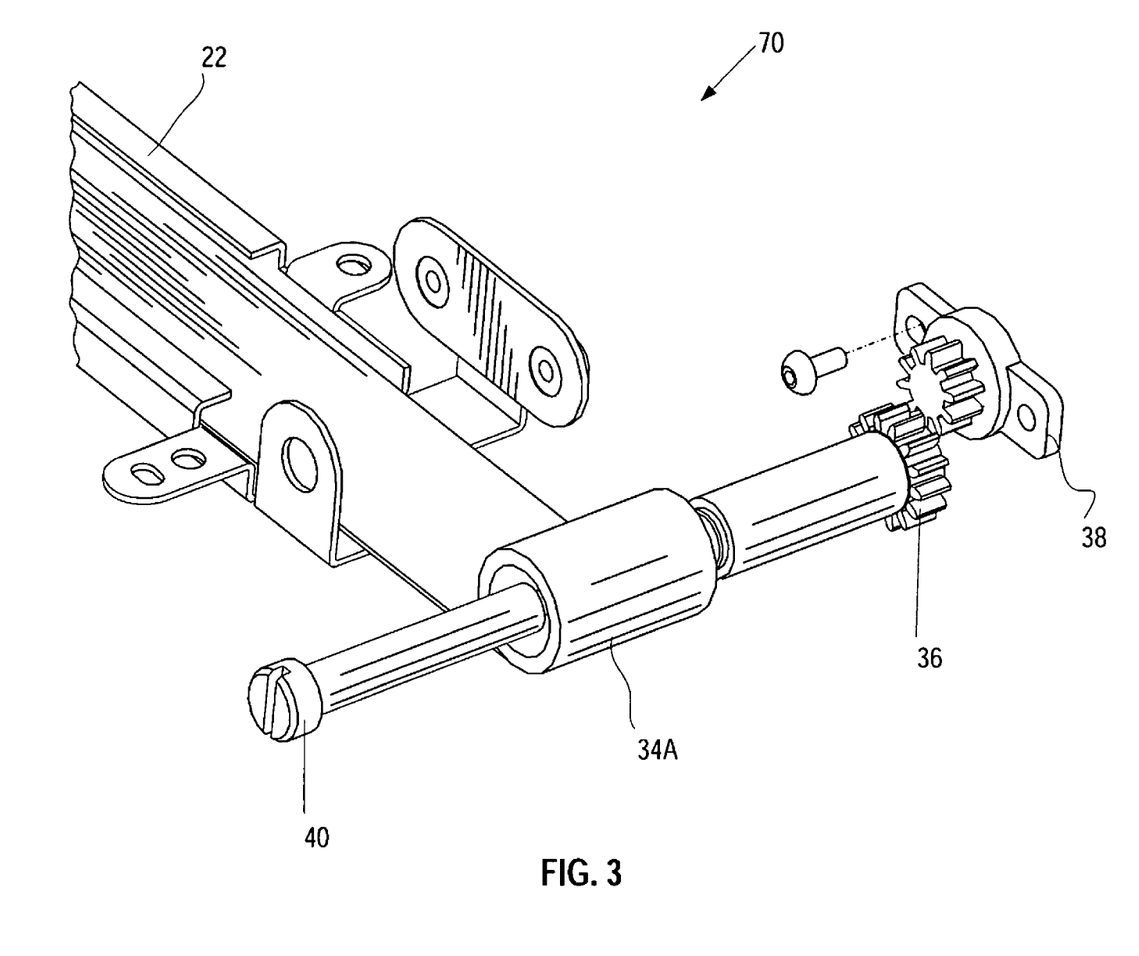
FIG. 3 is a side view of some component parts that when put together form a second end of a retraction mechanism of the subassembly of FIG. 1.

Turning now to FIG. 3, with continued reference to FIGS. 1 and 2, a side view of some component parts that when put together form a second end of a retraction mechanism 70 of the subassembly 10 of FIG. 1 is illustrated. First end of biasing member 34A includes geared shaft 36, rotary damper 38, and/or shoulder screw 40. While biasing member 34 is illustrated as a constant force spring, other biasing members 34 could be used that include some, all, or additional components than shown in FIG. 3.

Figure 4:
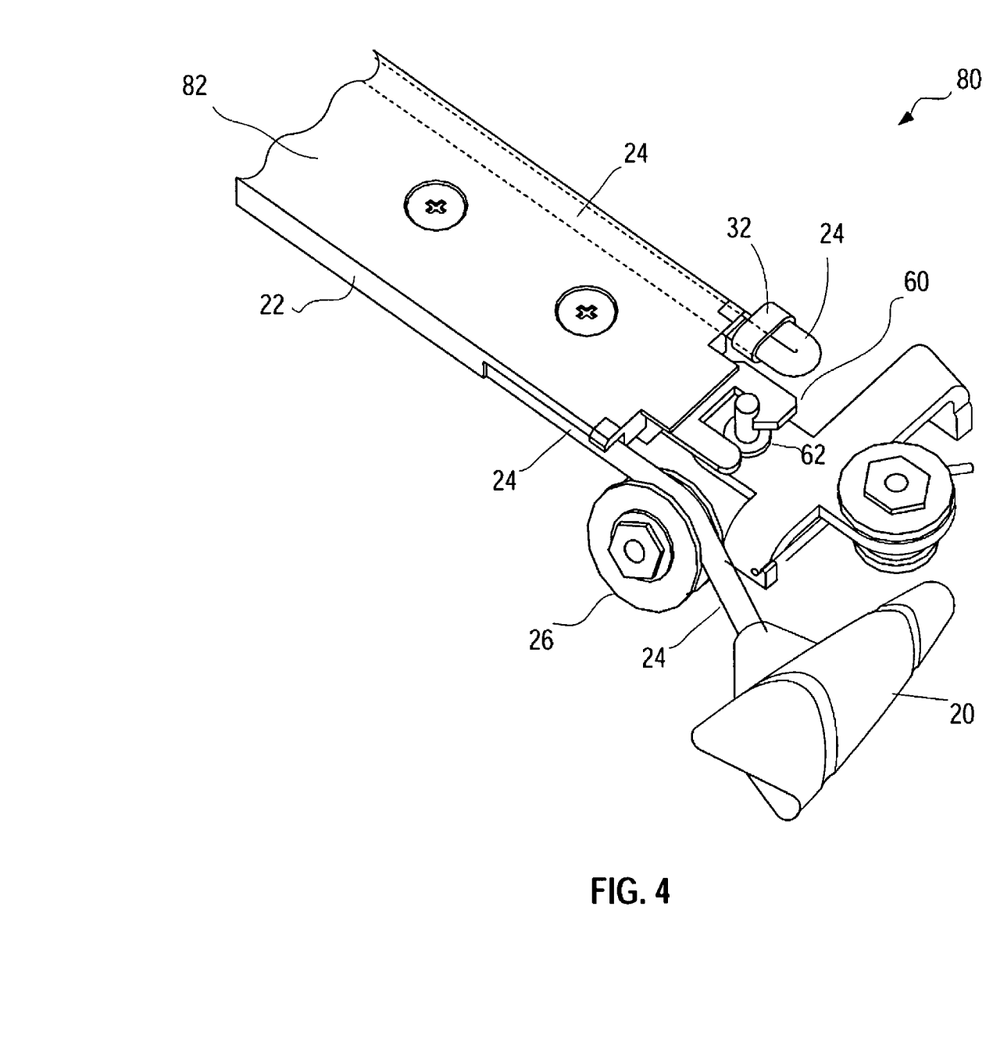
FIG. 4 is a bottom view of a first end of a retraction mechanism showing a latch mechanism for the subassembly of FIG. 1.

FIG. 4 is a bottom view of a first end of a retraction mechanism 80 showing a latch mechanism for the subassembly of FIG. 1. Bottom side 82 of retraction mechanism 80 includes a latch (first latch member) 60 which engages a second latch member 62 (e.g. a screw, pin, etc.) to secure cable 24 in the extended configuration 44 so that there is no tension on the cable 24 during use of input device 20 that would cause cable 24 to retract. In other implementations, an actuatable latch in a fixed location could engage cable 24 or another moving member, in which case the input device 20 would be deployed any incremental amount and then allowed to retract when the user depresses the retract mechanism (such as button 112 on FIG. 8).

Figure 5:
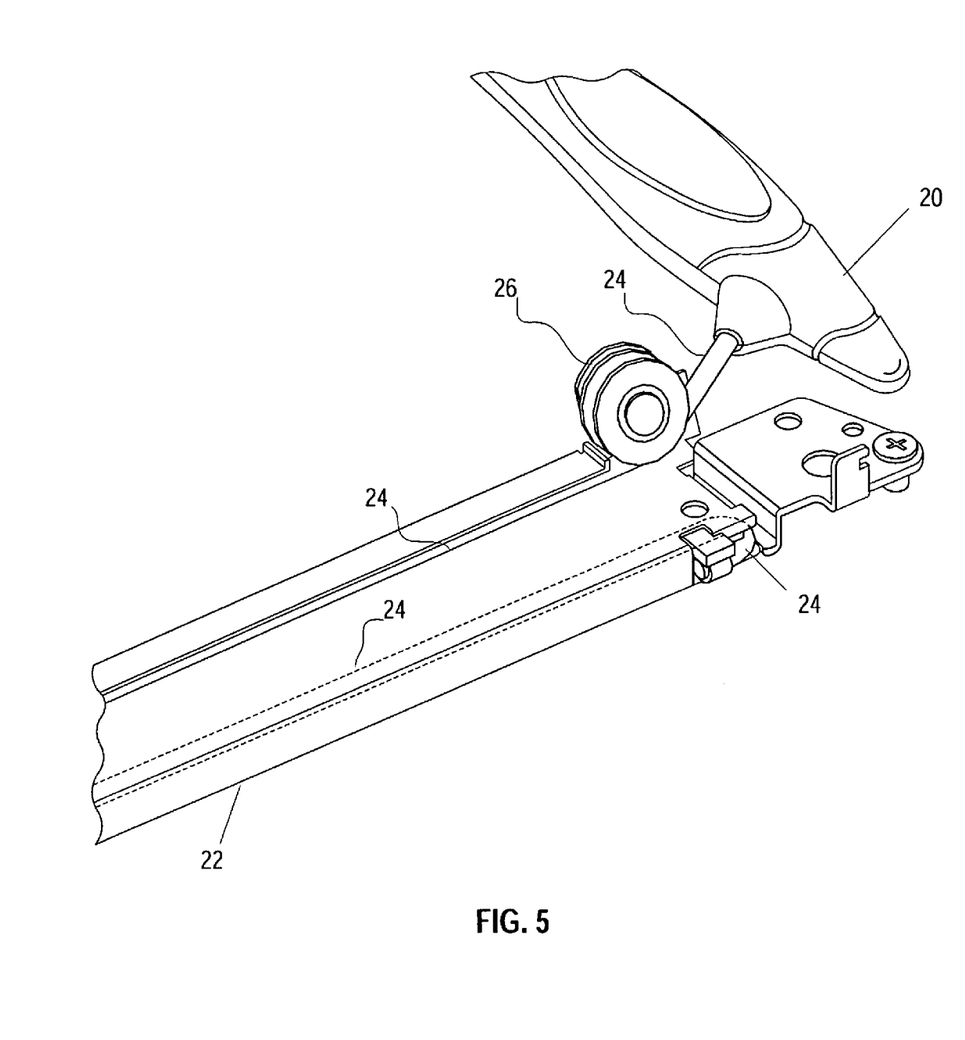
FIG. 5 is a side view of a first end of a retraction mechanism showing a cable travel path of the subassembly of FIG. 1.

FIG. 5 is a side view of a first end of a retraction mechanism showing a cable travel path for cable 24 of the subassembly 10 of FIG. 1. Cable 24 travels underneath exit roller 26, along housing 22 on a first side, crossing over at a point off of the figure and then extending again in parallel along housing 22 on a second side.

Figure 6:
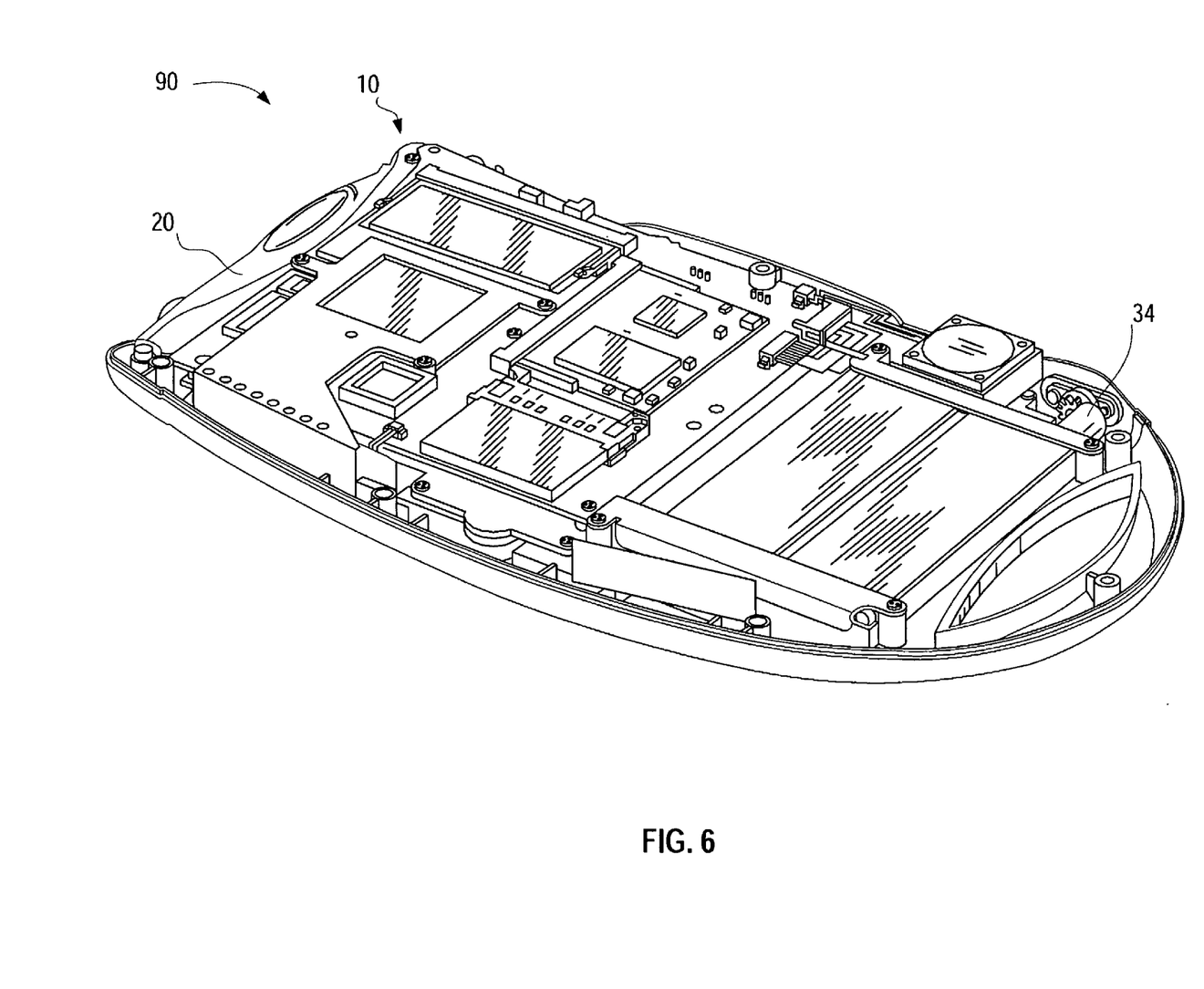
FIG. 6 is an interior view of some component parts of a computing device containing the cord retraction subassembly of FIG. 1.

FIG. 6 is an interior view of some component parts of a computing device 90 containing the cord retraction subassembly 10 of FIG. 1. In the figure shown, biasing member 34 and input device 20 are visible, and the other components are hidden under other component parts of computing device 90.

Figure 7:
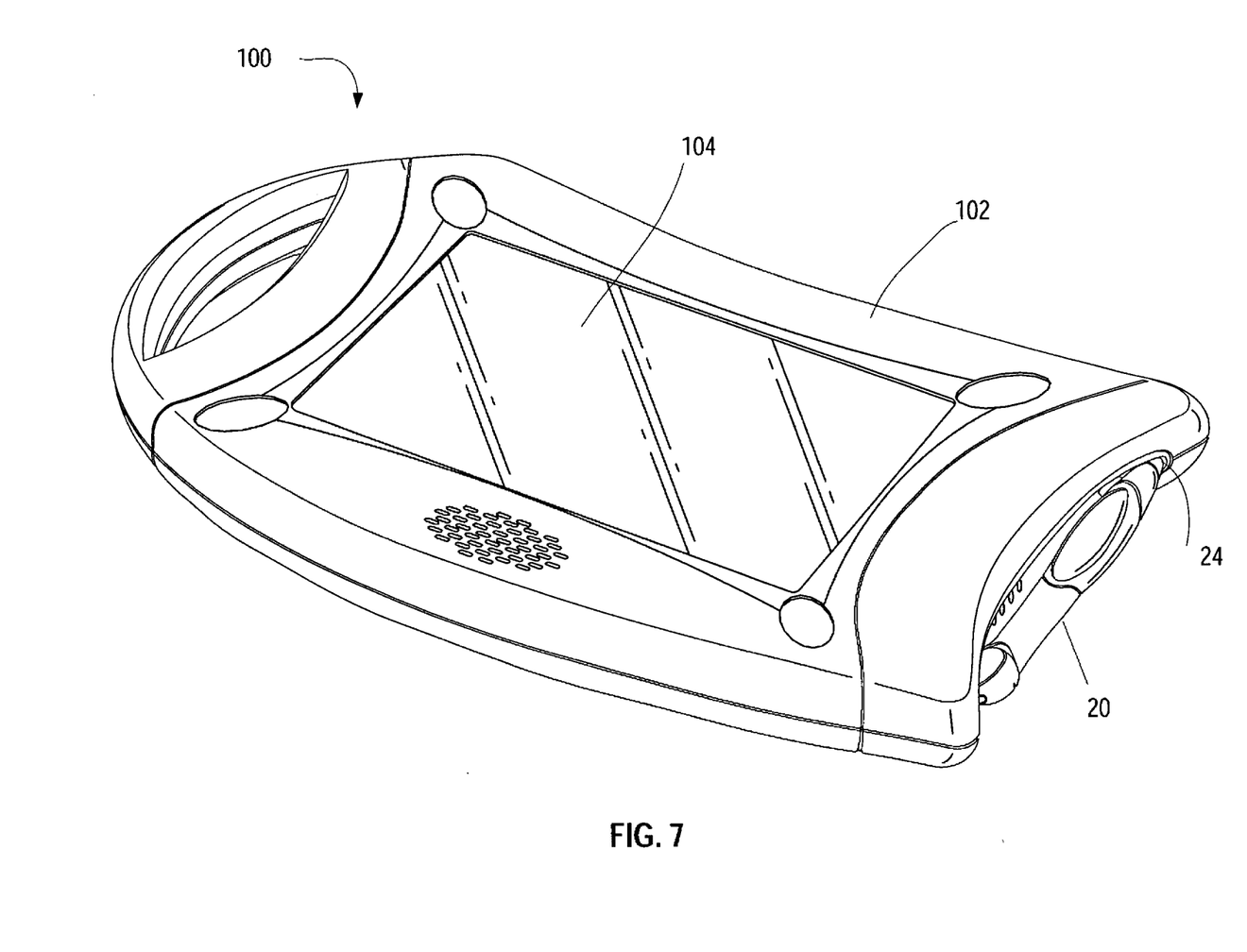
FIG. 7 is an exterior view of a computing device containing the cord retraction subassembly of FIG. 1 that illustrates the input device being in a storage configuration.
Figure 8:
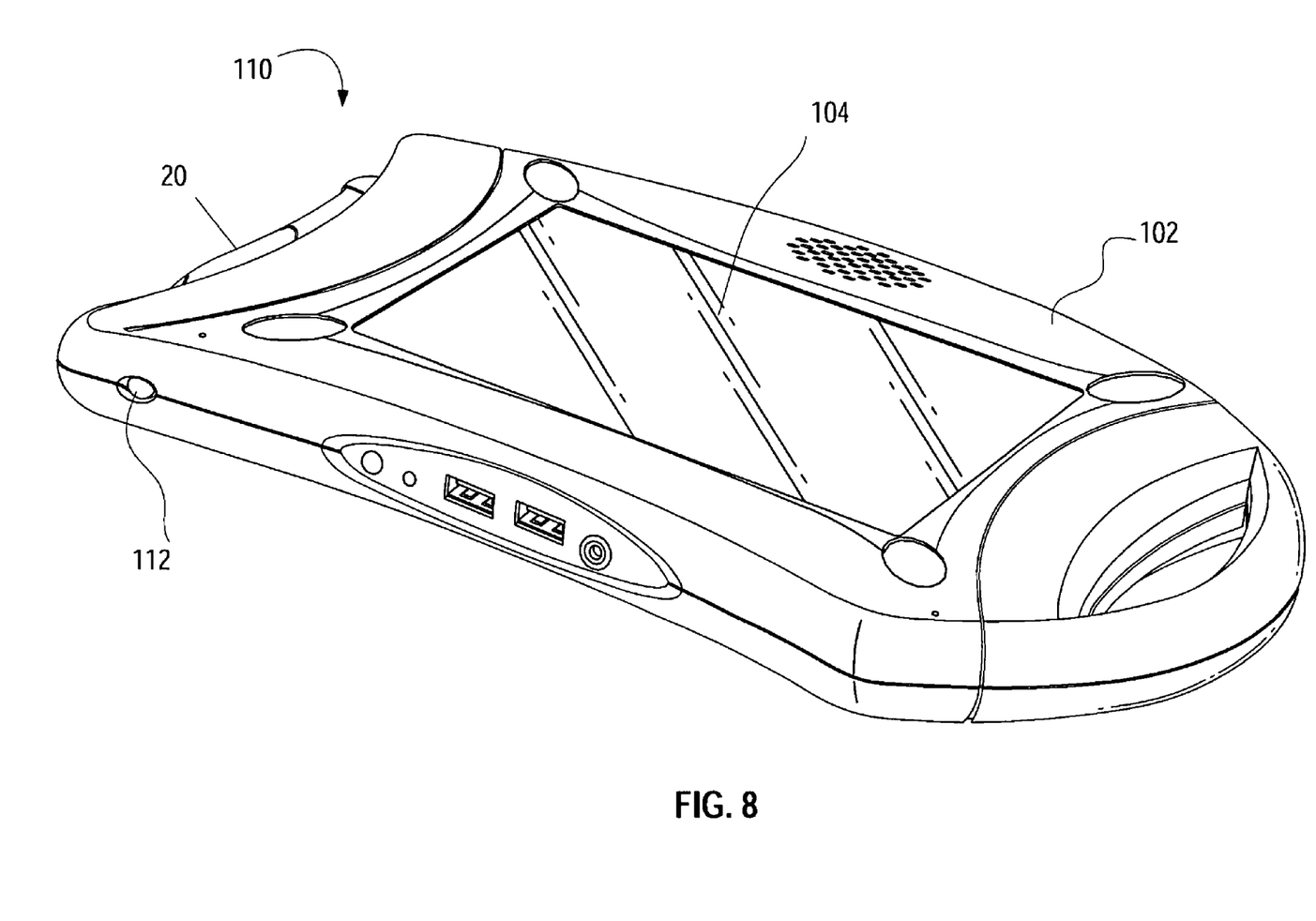
FIG. 8 is an exterior view of a computing device containing the cord retraction subassembly of FIG. 1 that illustrates a button that can be used to retract the input device to the storage configuration.

FIG. 7 is an exterior view 100 of a computing device 102 containing the cord retraction subassembly of FIG. 1 that illustrates the input device 20 being in a storage configuration. Upon pulling upon input device 20 to extend cable 24, the cord retraction subassembly is engaged as described herein to provide the user with slack in the cable to allow use of the input device 20, such as with display device 104. Turning now to FIG. 8, an exterior view 110 of computing device 100 containing the cord retraction subassembly of FIG. 1 is shown that illustrates a release member or button 112 that can be used to retract the input device 20 to the storage configuration 42.

Figure 9:
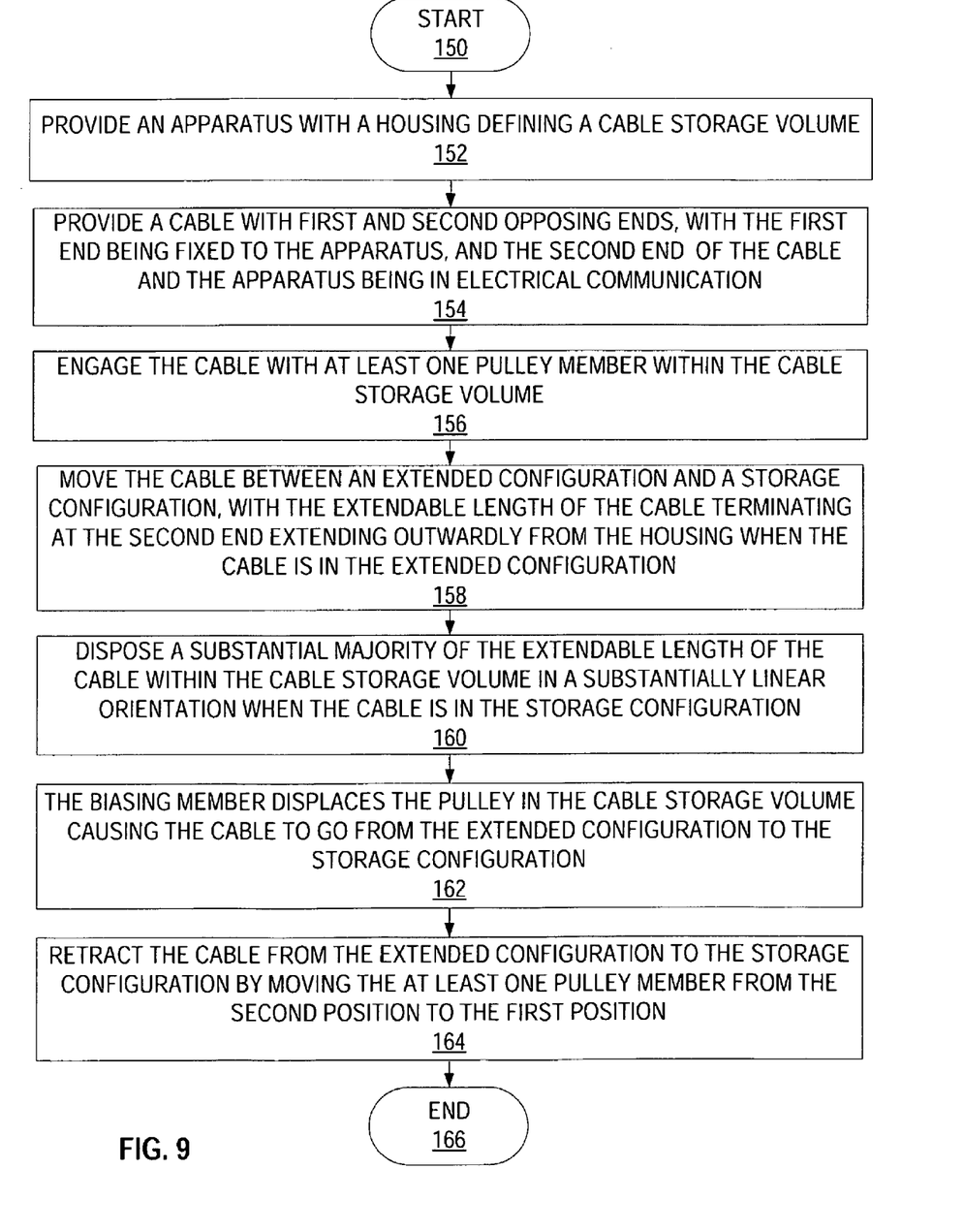
FIG. 9 is a process flow diagram for one implementation of the cord retraction subassembly of FIG. 1 illustrating the stages involved in allowing an input device of a computing device to be moved from a storage configuration to an extended configuration.

FIG. 9 is a process flow diagram for one implementation of the cord retraction subassembly of FIG. 1 illustrating the stages involved in allowing an input device of a computing device to be moved from a storage configuration to an extended configuration. The process begins at start point 150 with providing an apparatus with a housing defining a cable storage volume (stage 152). A cable is provided with first and second opposing ends, with the first end being fixed to the apparatus, and the second end of the cable and the apparatus being in electrical communication (stage 154). The cable is engaged with at least one pulley member within the cable storage volume (stage 156). The cable is moved between an extended configuration and a storage configuration, with the extendable length of the cable terminating at the second end extending outwardly from the housing when the cable is in the extended configuration (stage 158). A substantial majority of the extendable length of the cable is disposed within the cable storage volume in a substantially linear orientation when the cable is in the storage configuration (stage 160). The biasing member displaces the pulley in the cable storage volume causing the cable to go from the extended configuration to the storage configuration (stage 162). The cable is retracted from the extended configuration (stage 164) to the storage configuration by moving the pulley member from the second position to the first position (stage 164). The process ends at end point 166.

Figure 10:
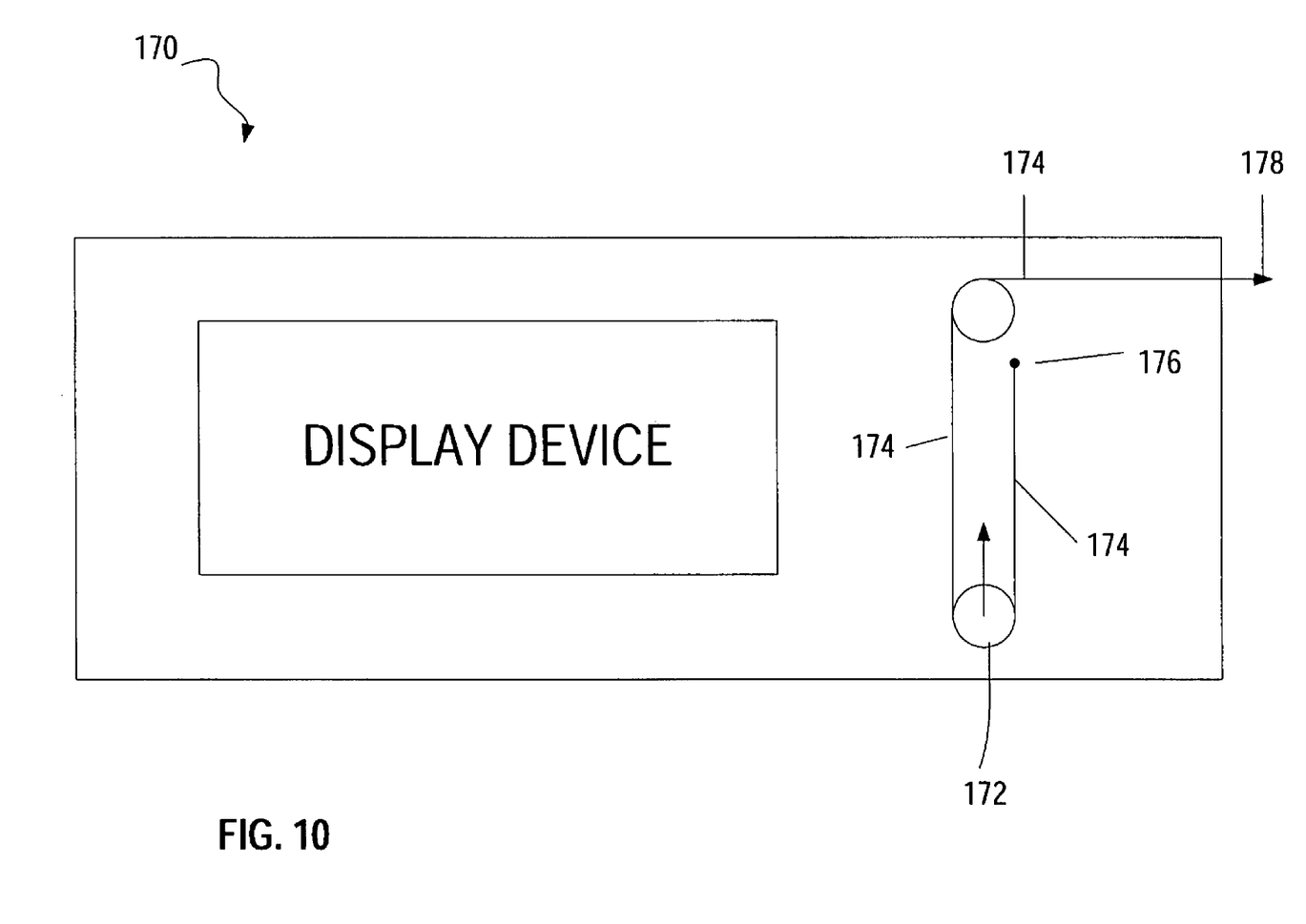
FIG. 10 is a top simplified view of a computing device having a cord retraction mechanism using a moving pulley member for deploying an input device in another implementation.

FIG. 10 is a top simplified view of a computing device 170 having a cord retraction mechanism using a moving pulley for deploying an input device 178 in another implementation. The cord retraction mechanism for input device 178 is similar to the one described in FIG. 1-8, except that the orientation of moving pulley member 172 and fixed pulley member 174 is perpendicular with the display device instead of parallel to it.

Figure 11:
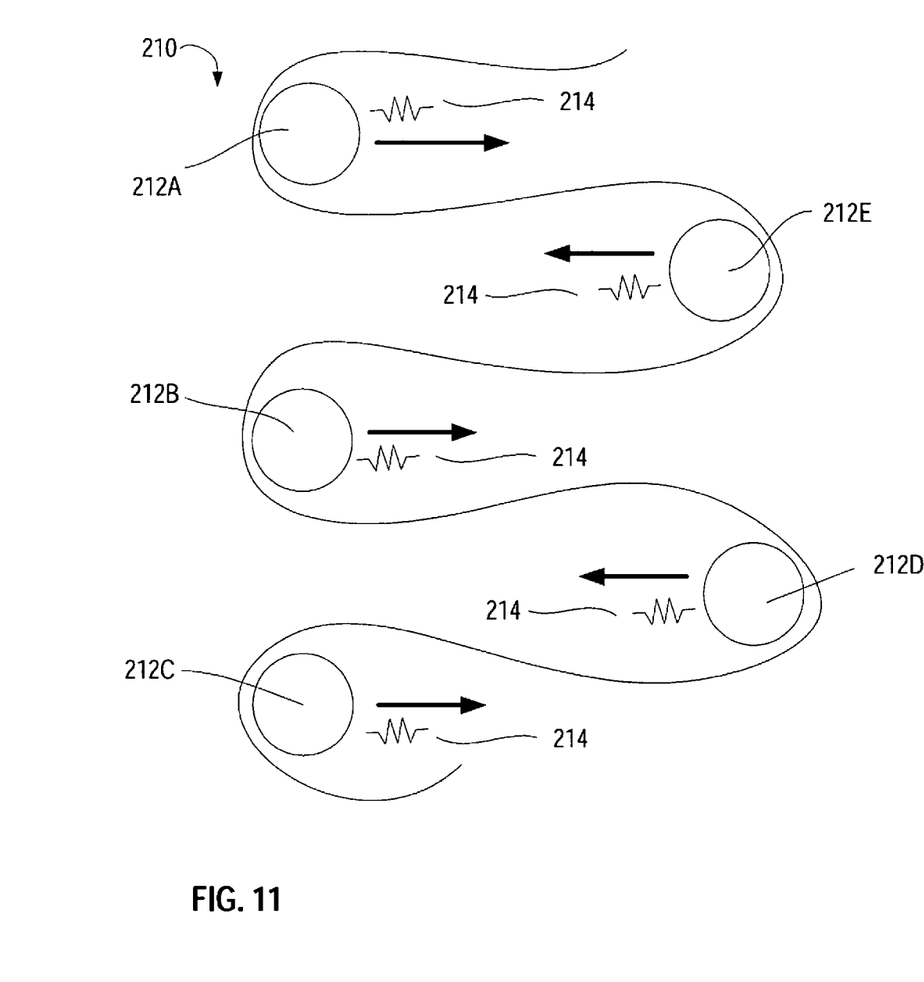
FIG. 11 is a partial diagrammatic view of a cord retraction mechanism using spring loaded pulley members for deploying an input device in another implementation.

FIG. 11 is a partial diagrammatic view of a cord retraction mechanism using spring loaded pulleys for deploying an input device in another implementation which can be used with other components of the cord retraction mechanism described herein in the other figures. Only a small part of the mechanism is shown to preserve clarity. Multiple pulley members 212A, 212B, 212C, 212D, and 212E, (collectively 212) are shown. Each of the pulley members 212 are moveable between a first position and a second position with movement of the cable from the storage configuration to the extended configuration displacing each of the pulley members from respective first positions to respective second positions and wherein movement of the pulley members from the respective second positions to the respective first positions retracts the cable from the extended configuration to the storage configuration. Each of the pulley members 212 is operably coupled with a biasing member 214 wherein each of the pulley members 212 is biased toward the respective first positions. Movement of each of the pulley members between the respective first and second positions defines a respective travel path for each of the pulley members, the travel paths being positioned substantially parallel to one another. The cable (e.g. 24) intersects each of the travel paths when in the extended configuration, each of the pulley members 212 define a travel direction from the first position to the second position, and adjacent ones of the pulley members define opposite travel directions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

What is claimed is:

1. An apparatus comprising:
   an input device;
   a cable having first and second opposing ends, the first end being operable to be coupled to a computing device, the second end being operable to be coupled to the input device, the cable providing electrical communication between the computing device and the input device, the cable having an extended configuration and a storage configuration wherein an extendable length of the cable terminating at the second end extends outwardly from the computing device when the cable is in the extended configuration, and wherein a majority of the extendable length is disposed in a substantially linear orientation when the cable is in the storage configuration;
   a retraction mechanism including at least one pulley member, the at least one pulley member being displaceable between a first position and a second position and wherein movement of the cable from the storage configuration to the extended configuration displaces the at least one pulley member from the first position to the second position; and
   first and second latching members, the first and second latching members being releasably engaged when the at least one pulley member is moved to the second position, engagement of the first and second latching members securing the cable in the extended configuration, release of the first and second latching members permitting retraction of the cable from the extended configuration to the storage configuration.

2. The apparatus of claim 1 wherein the first end of the cable is non-movably fixed to the computing device.

3. The apparatus of claim 1 further comprising a biasing member operably coupled with the retraction mechanism and biasing the at least one pulley member toward the first position.

4. The apparatus of claim 1 wherein the apparatus further comprises a processor and an output device operably coupled with the processor, the cable providing electrical communication between the input device and the processor.

5. The apparatus of claim 4 wherein the output device is a display screen and the input device is a stylus.

6. The apparatus of claim 1 further comprising a mounting member, the at least one pulley member being mounted on the mounting member wherein translational movement of the mounting member moves the at least one pulley member between the first and second positions.

7. The apparatus of claim 6 further comprising a biasing member positioned to exert a biasing force on the mounting member and thereby bias the at least one pulley member toward the first position.

8. The apparatus of claim 7 further comprising a first latching member and a second latching member, the first and second latching members being releasably engaged when the at least one pulley member is moved to the second position, engagement of the first and second latching members securing the at least one pulley member in the second position, release of the first and second latching members permitting retraction of the cable from the extended configuration to the storage configuration.

9. The apparatus of claim 1 wherein movement of the at least one pulley member between the first and second position defines a linear travel path and the extendable length of the cable defines at least two linear sections when in the storage configuration, the linear travel path and the at least two linear sections each being positioned proximate and parallel to one another when the cable is in the storage configuration.

10. The apparatus of claim 1 wherein the at least one pulley member comprises a plurality of pulley members, each of the pulley members being moveable between a first position and a second position wherein movement of the cable from the storage configuration to the extended configuration displaces each of the plurality of pulley members from respective first positions to respective second positions and wherein movement of the plurality of pulley members from the respective second positions to the respective first positions retracts the cable from the extended configuration to the storage configuration, each of the plurality of pulley members being operably coupled with a biasing member wherein each of the plurality of pulley members is biased toward the respective first positions, movement of each of the pulley members between the respective first and second positions defining a respective travel path for each of the plurality of pulley members, the travel paths being positioned substantially parallel to one another and wherein the cable intersects each of the travel paths when in the extended configuration, each of the pulley members define a travel direction from the first position to the second position, and adjacent ones of plurality of pulley members define opposite travel directions.

11. The apparatus of claim 1 wherein the second end of the cable is non-detachable so the input device cannot be lost.

12. The apparatus of claim 1 further comprising a dampening member operably coupled with the retraction mechanism and dampening the movement of the at least one pulley member from the second position to the first position.

13. The apparatus of claim 12 further comprising:
    a constant force spring operably coupled with the retraction mechanism, extension and retraction of the constant force spring exerting a force biasing the at least one pulley member toward the first position;

a gear operably coupled to the constant force spring wherein the gear rotates as the constant force spring is extended and retracted; and a rotary damper operably coupled with the gear and dampening the force exerted by extension and retraction of the constant force spring.

14. A apparatus comprising:

a housing, the housing defining a cable storage volume;

a display screen coupled with the housing;

a processor disposed within the housing and operably coupled with the display screen;

an input device;

a cable having first and second opposing ends, the first end being non-rotatably fixed to the apparatus, the second end being operably coupled to the input device, the cable providing electrical communication between the processor and the input device, the cable having an extended configuration and a storage configuration wherein an extendable length of the cable terminating at the second end extends outwardly from the housing when the cable is in the extended configuration, and wherein a substantial majority of the extendable length is disposed within the cable storage volume and a majority of the extendable length is disposed in a substantially linear orientation when the cable is in the storage configuration;

a mounting member slidably disposed within the cable storage volume;

at least one pulley member mounted on the sliding mounting member and engagable with the cable, the at least one pulley member being displaceable between a first position and a second position by sliding movement of the mounting member and wherein movement of the cable from the storage configuration to the extended configuration displaces the at least one pulley member from the first position to the second position:, and first and second latching members, the first and second latching members being releasably engaged when the at least one pulley member is moved to the second position, engagement of the first and second latching members securing the cable in the extended configuration, release of the first and second latching members permitting retraction of the cable from the extended configuration to the storage configuration.

15. The apparatus of claim 14 further comprising a biasing member operably coupled with the mounting member and biasing the at least one pulley member toward the first position.

16. The apparatus of claim 15 further comprising a first latching member disposed on the mounting member and a second latching member fixed relative to the housing, the first and second latching members being releasably engaged when the at least one pulley member is moved to the second position, engagement of the first and second latching members securing the at least one pulley member in the second position, release of the first and second latching members permitting retraction of the cable from the extended configuration to the storage configuration.

17. The apparatus of claim 16 wherein the at least one pulley member is rotatably mounted on the mounting member.

18. A method of extending and retracting a cable, the method comprising:

providing a apparatus wherein the apparatus includes a housing defining a cable storage volume;

providing a cable having first and second opposing ends, the first end of the cable being fixed to the apparatus, and wherein the second end of the cable and the apparatus are in electrical communication;

engaging the cable with at least one pulley member within the cable storage volume;

moving the cable between an extended configuration and a storage configuration wherein an extendable length of the cable terminating at the second end extends outwardly from the housing when the cable is in the extended configuration, and wherein a substantial majority of the extendable length is disposed within the cable storage volume and a majority of the extendable length is disposed in a substantially linear orientation when the cable is in the storage configuration wherein the at least one pulley member is displaced within the cable storage volume from a first position to a second position by movement of the cable from the extended configuration to the storage configuration and wherein movement of the at least one cable management member from the second position to the first position retracts the cable from the extended configuration to the storage configuration; and releasably engaging first and second latching members when the at least one pulley member is moved to the second position, wherein engagement of the first and second latching members secures the cable in the extended configuration, and wherein release of the first and second latching members permits retraction of the cable from the extended configuration to the storage configuration.

19. The method of claim 18 further comprising the step of providing a biasing member to bias the at least one pulley member toward the first position.

* * * * *